June 2, 1953  K. J. SHOMBER  2,640,246
SEPARABLE HEADED FASTENING DEVICE
Filed March 17, 1950
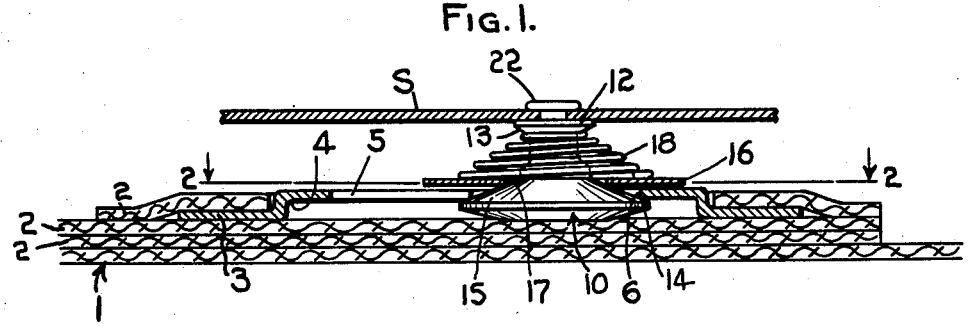
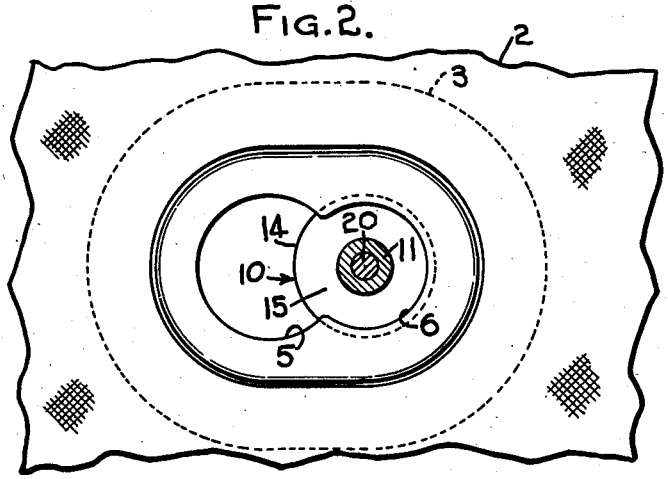
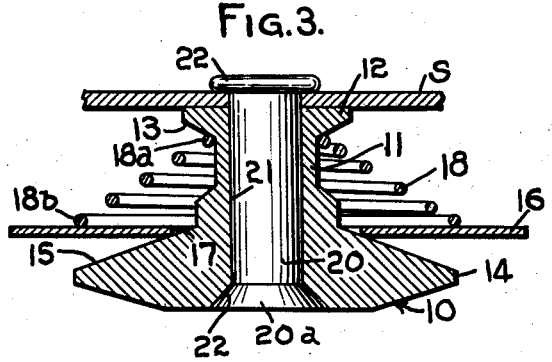
INVENTOR:
KERIAN J. SHOMBER,
By John Todd
ATTORNEY.

Patented June 2, 1953

2,640,246

UNITED STATES PATENT OFFICE 2,640,246

SEPARABLE HEADED FASTENING DEVICE

Kerian J. Shomber, Oakland, Calif., assignor to United-Carr Fastener Corporation, Cambridge, Mass., a corporation of Massachusetts Application March 17, 1950, Serial No. 150,261

1 Claim. (Cl. 24—224)

The present invention relates to separable fastener members of the quick detachable type having a keyhole slotted socket member and a hanger stud member, and the invention aims particularly to improve the construction of the hanger stud member for such separable fasteners.

One use for separable fastener members of the above mentioned type is to detachably mount and support fuel cells and the like in aircraft where it may be desirable to quickly release a supported part carrying the socket part of the fastener from the supporting part which carries the stud. In such installations the fuel cells may be of laminated fabric construction to which is suitably secured the fastener plate having the keyhole slot and the stud member is a supporting hanger part fixed to a supporting structure of the aircraft.

A primary object of the present invention is to generally improve the construction of the hanger stud members of such detachable fasteners, and more particularly to simplify the construction thereof whereby such stud members may be more economically manufacturer, handled, and readily assembled in a supporting structure.

The above and other objects of the invention will be apparent to persons skilled in the art to which the invention relates from a consideration of the accompanying drawings and annexed specification illustrating and describing a preferred embodiment of the invention.

In the drawings—

Fig. 1 is a sectional view of a typical installation employing a quick detachable fastener for which my improved stud member is particularly adaptable;

Fig. 2 is a horizontal sectional view thereof as taken on the line 2—2 of Fig. 1; and Fig. 3 is an enlarged vertical sectional view of the improved stud member of the present invention.

Referring to the drawings, the invention is illustrated as embodied in a typical installation of fuel cells in aircraft structures employing a quick detachable fastener permitting the fuel cells to be released quickly when desired. Conventionally, the cells 1 are constructed of suitable textile material, of laminated construction, and between the laminations 2 of one surface, at least, of the cells is secured a fastener socket member 3 having a keyhole-shaped stud-receiving opening. Desirably the socket fastener member may be in the form of a plate having an outwardly dished central portion 4 provided with adjoining connected openings 5 and 6 of different diameters. The larger opening 5 will be of a diameter to permit free passage of the stud part therethrough and the diameter of the smaller opening 6 will be less than the stud diameter so as to retain the stud within the dished central portion 4 when the stud and opening 6 are in axial alignment. As will be apparent the restricted passage between the openings 5 and 6 will be of sufficient width for the free movement of the shank or neck portion of the stud therein and permit the relative lateral shifting of the socket plate 3 and stud from a releasable position in which the stud is coaxial with the opening 5 to a fastened or supported position in which the stud is coaxial with the opening 6.

My improved hanger stud fastener part, although not limited to installations of the above described type, is particularly adaptable thereto and comprises a stud member 10 having a shank portion 11 provided at one end with an outwardly extending support-engaging head or flange 12 adapted for flush bearing engagement with a surface of a suitable supporting structure S. The head 12 and shank 11 may be joined by an angular or conical face 13 providing a seat for a coil of a spring member hereinafter described. On the opposite end of the shank 11, and spaced from the support-engaging head, is an enlarged fastener-engaging stud portion 14 of a diameter slightly less than the opening 5 and somewhat greater than the opening 6 of the socket plate 3. The stud portion is preferably formed with a sloping fastener-engaging face 15 tapering from its peripheral edge toward the shank portion 11, and preferably this sloping face 15 may be a conical surface designed to have rim or edge contact with the fastener socket plate 3 at the edge of the opening 6 thereof.

In many installations it is desirable to provide the stud member with a fastener-engaging tensioning washer, and according to the present invention, it is desirable to preassemble the washer with the stud member for economy of manufacture and installation. Accordingly, there is provided a washer member 16 in the form of an apertured disc having a central aperture 17 of a size to be passed freely over the head end 12 but of substantially less diameter than the stud portion 14 so as to engage the conical surface 15 well inwardly from its peripheral edge. The washer 16 may be retained in preassembly with the stud by means of a conical coil spring 18, the smaller convolution 18ᵃ of which is substantially the diameter of the shank portion 11 and less than the head 12, and the larger convolution 18ᵇ of which may be substantially the same diameter as the stud portion 14. Thus, there is provided a spring tensioned washer that may be preassembled with the stud before attachment to the supporting structure S and which will exert a maximum pressure against the fastener socket plate opposite the line of contacting engagement thereof with the stud portion.

Preferably the stud member 10 is attached to its supporting structure S by means of a separate rivet 20 extended through an axial opening 21 through the stud member 10 having a countersunk seat 22 for the reception of the rivet head 20ᵃ, the opposite end of the rivet 20 being upset over the supporting structure S as at 22, as is well understood in the art. This manner of mounting and attaching the stud 10 to the supporting structure S is preferred as it permits of standardization of the stud members as to size irrespective of the length of the attaching member, use of an attaching member of metal of different tensile strength from that of the stud, and the support of the stud against shear throughout its length.

The improved hanger stud of the present invention is simple in construction, economical in cost of manufacture, assembly and installation, and provides a hanger of greater strength and durability than prior hangers of which I am aware.

While I have illustrated and described one preferred embodiment of the invention, I do not intend to be restricted to the details thereof as the scope of the invention is best defined in the appended claim.

I claim:

A hanger stud fastener member for attachment to a support by a rivet, said stud fastener member comprising a shank portion provided with a support-engaging and support-bearing head at one end thereof, an enlarged annular fastener-engaging stud portion at the opposite end of said shank portion and of a diameter substantially greater than the support-engaging head, a washer interposed between said head and stud portion with its inner diameter greater than the diameter of said head but less than the diameter of said stud portion, a conical coil spring having the inside diameter of its smaller convolution less than the diameter of said head and the outside diameter of its largest convolution less than the outer diameter of said washer, said smaller convolution being in tensioned engagement with said head and said larger convolution being in tensioned engagement with said washer and tending to urge said washer toward said stud portion, and said member being provided with an axial opening therethrough for the reception of an attaching rivet, and said opening having an outwardly extending enlargement at the stud end for the reception of a head of an attaching rivet extended therethrough.

KERIAN J. SHOMBER.

References Cited in the file of this patent

UNITED STATES PATENTS

| Number | Name | Date |
|---|---|---|
| 988,558 | England | Apr. 4, 1911 |
| 2,505,955 | Fuller | May 2, 1950 |